C. B. BURROWS.
NUT LOCK.
APPLICATION FILED JULY 26, 1909.

964,849.

Patented July 19, 1910.

Witnesses:
Carl L. Choate.
Robert H. Kammler.

Inventor:
Clarence B. Burrows,
by Murry Booth
Attys.

UNITED STATES PATENT OFFICE.

CLARENCE B. BURROWS, OF BEVERLY, MASSACHUSETTS, ASSIGNOR TO BEVERLY LOCK-NUT AND LOCK-BOLT COMPANY, A CORPORATION OF MASSACHUSETTS.

NUT-LOCK.

964,849.  Specification of Letters Patent.  Patented July 19, 1910.

Application filed July 26, 1909. Serial No. 509,555.

*To all whom it may concern:*

Be it known that I, CLARENCE B. BURROWS, a citizen of the United States, and a resident of Beverly, in the county of Essex and Commonwealth of Massachusetts, have invented an Improvement in Nut-Locks, of which the following description, in connection with the accompanying drawings, is a specification, like letters on the drawings representing like parts.

This invention relates to nut-locks its object being to provide a simple but efficient form of nut-lock which is capable of being manufactured in large quantities without practical difficulties and at a low cost.

The invention will be best understood by reference to the following description when taken in connection with the accompanying illustration of one specific embodiment thereof while its scope will be more particularly pointed out in the appended claims.

Figure 1:
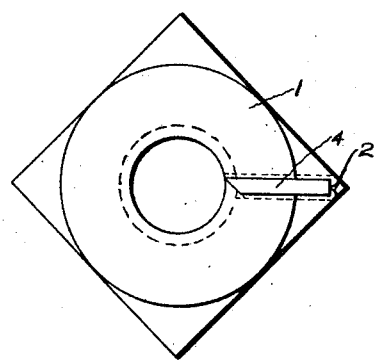
Figure 2:
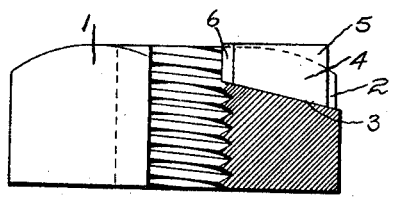
Figure 3:
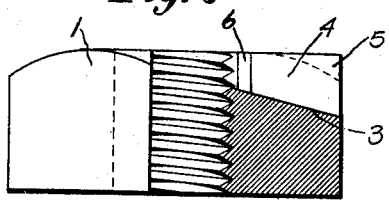
Figures 4, 5:
Figure 6:
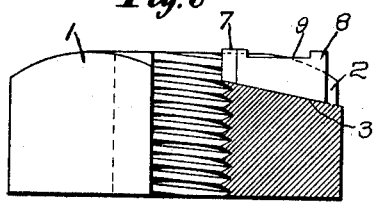
Figure 7:
Figure 8:
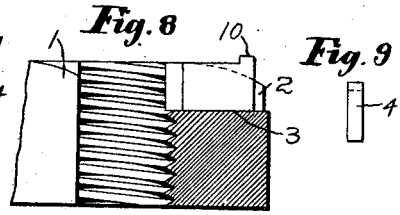
Figure 9:

In the drawings: Figure 1 is a plan view of a nut provided with a locking device embodying one form of my invention. Fig. 2 is an elevation partly in section showing the key in its applied position of Fig. 1. Fig. 3 is a similar elevation showing the key in its released position. Fig. 4 is an end elevation of the key shown in Fig. 3. Fig. 5 is an end elevation of a modified form of key. Fig. 6 is a sectional elevation showing a nut with a modified form of nut-lock. Fig. 7 is an end elevation of the nut-lock. Figs. 8 and 9 are similar views of still another modified form of nut lock.

Referring to Figs. 1 to 4 inclusive and to the embodiment of my invention which I have there shown for illustration, an ordinary nut 1 is shown provided with a slot-like cavity 2 extending transversely from the threaded bolt hole toward the side walls of the nut. While the slot may be located in any suitable part of the nut and may terminate short of its side walls, in order to weaken the walls of the nut as little as possible the slot is cut toward one of the corners of the nut through its greatest available cross sectional area, and, for convenience in applying or releasing the key it is cut entirely through the side walls.

As shown in Figs. 2 and 3 the bottom 3 of the slot is inclined downwardly toward the exterior of the nut and away from the threaded bolt hole so as to form an outwardly and downwardly inclined seat for the key 4, the lower edge of the latter being preferably so shaped as to conform to the incline of the slot bottom.

The key is suitably proportioned to present a projecting portion 5 extending above the upper or outer surface of the nut and preferably at the rear of the key. If desired, the key may present this projection by means of a raised portion (as shown in Fig. 6) but, owing to the usual bevel of the nut, the key, if constructed so as to be flush with or somewhat below the upper surface of the nut when in its released position (Fig. 3), will present a corner as shown in Fig. 2 projecting above the nut, which corner at its outer or back edge can be struck a blow with a hammer or other implement to drive the key inwardly within the slot and from the position shown in Fig. 3 to that shown in Fig. 2.

The inner or cutting edge 6 of the key is sharpened (and the key is preferably of hardened steel) so that the application of the key causes its thread indenting edge to sink into the threads of the bolt and hold the latter against turning until the key is intentionally released.

Means are preferably provided to retain the key as a permanent part of the nut while permitting its repeated application and release to the threads of the bolt. In the key shown in Figs. 1-3 this is accomplished by giving the side of the key a gradual bevel from its lower part to the top as shown in Fig. 4 so that the key has the appearance of a wedge in end view or cross section. When this key is placed in the slot, the walls of the latter are forced in and about the upper or narrow portion of the key by pressure applied against the top surface of the nut by any suitable means. This effectively retains the key against the withdrawal from the top of the slot, while the bevel of the side walls of the key is so gradual that it readily permits the slight endwise movement of the key in the slot which is necessary for its application or release.

In its released position the back of the key preferably terminates approximately flush with the edge of the nut so that when driven into the position shown in Fig. 2 there is left a small amount of metal back of the key and at the corner of the nut on either side of the slot which metal can be upset or headed over the back of the key by the same implement which is used to drive the key into the threads of the bolt. This serves effectively to prevent release of the key until such release is desired. To release the key a sharp blow delivered on the upper edge of the key and preferably slanting outwardly will free the key from the bolt threads and drive it down the incline and to the rear of the slot, forcing it from the position shown in Fig. 2 to that shown in Fig. 3. It will therefore be seen that the inclined seat facilitates the release of the key when desired, requiring only the application of a hammer or other implement to the projecting portion of the key, while at the same time it permits the forcing of the key against the bolt for locking the nut by an equally simple application of the hammer, or other tool, to the said projecting portion. The relatively soft metal which has been previously upset at the back of the key will readily yield to permit this releasing movement of the key.

To better lock the key against accidental release the edge 6 of the key is preferably shaped as shown in Fig. 1 so that the bevel of the edge is mainly or wholly on the side of the key opposite to that which receives the thrust or strain of the bolt if the latter tends to unthread. This prevents any wedging action by the bolt against the key which would occur to some extent if an edge beveled or partly beveled were presented to the bolt on that side of the key.

If a key with a beveled side wall is employed it is unnecessary that both side walls should be beveled as shown in Fig. 4, but a wedge-shaped key, such as shown in Fig. 5, may be utilized having one wall only formed with a bevel.

If desired a key with parallel side walls may be employed such as is shown in Fig. 7 such key being permanently retained in the nut by heading over the metal on the top surface of the nut against the top of the key which latter is provided with front and rear projections 7 and 8 respectively and the intermediate depression 9. The key is retained by upsetting the metal in the side walls of the slot over the depresseion 9.

While preferably a slot is employed having an inclined seat, if desired, a slot and a key may be utilized as shown in Figs. 8 and 9 where no inclination is provided. Here the key is applied to the threads of the bolt in the same manner as described with reference to the key in Figs. 1–3 inclusive. To release the key however, it is provided with an upward rear projection 10 which may be struck obliquely a slanting blow so directed as to drive the key out of engagement with the threads of the bolt and to the rear of the slot.

Many changes may be made in construction and relative arrangement of the parts herein described without departing from the spirit of the invention, the foregoing modifications having been submitted solely for the sake of illustrating the invention.

Claims.

1. A nut having a slot shaped cavity opening into the bolt hole and having a seat inclined away from the bolt hole and a bolt engaging key in said cavity having a thread-engaging end adapted to be forced against the threads of the bolt, said key having a sliding engagement with said inclined seat whereby the release of the key may be facilitated.

2. A nut having a slot shaped cavity opening into the bolt hole and having an inclined seat, and a thread indenting key having a thread indenting end adapted to be driven in an approximately radial direction toward the bolt to enter the threads thereof, said key having a sliding engagement with said inclined seat.

3. A nut having a slot shaped cavity opening into the bolt hole and also upon the upper surface of the nut, and having an inclined seat, a thread engaging key in said cavity having a sliding engagement with said seat, said key presenting a portion projecting above the open mouth of the slot whereby the key may be forced into the threads of the bolt or back to a position of release.

4. A nut having a slot shaped cavity 2 provided with an inclined seat 3, the thread indenting key 4 slidable in said cavity and on said seat, the projecting portion 5 and the thread engaging end 6.

5. A nut having a cavity terminating at the bolt hole and opening through the upper and outer walls of the nut, a thread indenting key presenting a driving portion projecting above the upper walls of the nut, said key in its locked position terminating short of the side walls of the nut whereby it may be locked therein by upsetting the metal thereat.

In testimony whereof, I have signed my name to this specification, in the presence of two subscribing witnesses.

CLARENCE B. BURROWS.

Witnesses:
EVERETT S. EMERY,
ROBERT H. KAMMLER.